United States Patent
Iwashita et al.

(10) Patent No.: US 6,391,350 B1
(45) Date of Patent: *May 21, 2002

(54) METHOD FOR THE PRE-BAKING TREATMENT OF CHUNK OF FROZEN BREAD DOUGH

(75) Inventors: Yushi Iwashita, Shimada; Yoshiji Adachi, Kawasaki, both of (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/657,844

(22) Filed: Sep. 8, 2000

(30) Foreign Application Priority Data

Sep. 10, 1999 (JP) ............................................. 11-258030

(51) Int. Cl.⁷ ................................................. A21D 8/00
(52) U.S. Cl. ............................... 426/27; 426/8; 426/61; 426/62; 426/128; 426/393; 426/496; 426/524
(58) Field of Search ............................ 426/524, 27, 19, 426/393, 128, 8, 61, 62, 496

(56) References Cited

U.S. PATENT DOCUMENTS 3,436,228 A * 4/1969 Lind ........................ 426/128
3,436,232 A * 4/1969 Taylor et al. ................ 426/128
5,084,284 A * 1/1992 McDilda et al. ............. 426/128
5,580,591 A * 12/1996 Cooley et al. ................. 426/8

OTHER PUBLICATIONS

E.J. Pyler, "Baking Science & Technology", 1988, pp. 731–737.*

* cited by examiner

*Primary Examiner*—Lien Tran
(74) *Attorney, Agent, or Firm*—Oblon, Spivak, McClelland, Maier & Neustadt, P.C.

(57) ABSTRACT

A method for pre-baking treatment of a chunk of frozen bread dough includes placing the chunk of frozen bread dough in a container and keeping an inner temperature of the container in a range of 17° C. to 40° C. and relative humidity in the container in a range of 50% to 75% to thaw and proof the chunk of frozen bread dough continuously. The inner temperature of the container is lowered to a range of −20° C. to 15° C. at a lowering rate of at least 0.2° C./min after proofing the bread dough. A temperature difference between a dew point of air inside the container and a surface temperature of the bread dough is controlled to be within 20° C. during the lowering step. The bread dough is taken out from the container, shaped, and finally proofed in a proofer.

21 Claims, No Drawings

METHOD FOR THE PRE-BAKING TREATMENT OF CHUNK OF FROZEN BREAD DOUGH

TECHNICAL FIELD

The invention relates to a method for the pre-baking treatment of a chunk of frozen bread dough, which, in this specification, means unshaped dough with no particular form.

BACKGROUND ART

A chunk of frozen bread dough is usually taken out from a freezer or a refrigerated warehouse, and thawed out in a room(a room temperature method) or in a proofer (a thawing and proofing method). After the completion of thawing, dough with a temperature of between 0° C.~20° C. is put in a proofer for a final proofing process. The thawing may be finished in 1~3 hours in these methods. However, since the surface of the bread dough will be seriously dampened in these methods, a precaution has to be taken against the dampness, including the covering of the bread dough with a sheet of plastic film.

Recently, a thawing method using a retarder is adopted for relieving workers of their early morning shift, in which the thawing process is carried out for 6~24 hours at a temperature range of 0° C.~5° C. Further, a dough conditioner is used in which the retarder is equipped with a computer system, enabling a continuous and automated processes of thawing and final proofing.

Japanese Patent Publication Hei.6-36707 discloses a thawing method, comprising heating shaped and frozen bread dough for 2~6 hours up to a temperature of 10° C. at an average temperature-raising rate of 0.07~0.28° C./min and a relative humidity of 70~100%, and further keeping it for 10 min~6 hours at a temperature of 10° C.~20° C. and a relative humidity of 70~100%.

Japanese Patent Application Laid Open Hei.5-64539 discloses a bread-making method, comprising thawing with retardation frozen bread dough for 10 min~72 hours at a temperature of −5~10° C./min, a relative humidity of 90~100% and ventilation rate of 0.2 m/s or less, pre-heating it for one hour and 20 min~2 hours and 10 min up to a temperature of 15~20° C., heating it for 20 min~one hours and 10 min up to a temperature of 22~40° C., keeping it for 20 min~3 hours at the same temperature, and then baking the bread dough.

Japanese Patent Application Laid Open Hei.7-155100 discloses a method of keeping bread in a suitable condition for baking for a long period of time, comprising keeping the bread at a temperature of 0~18° C. after final proofing in order to inhibit the activity of bakers' yeast.

Japanese Patent No. 2729669 discloses a method for the pre-baking treatment of frozen bread dough comprising adjusting a thawing condition for each of different kinds of bread that need different time for their final proofing, so that their final proofing may be done simultaneously.

The purpose of the present invention is first to simplify complicated pre-baking work, secondly to standardize the pre-baking work of various kinds of bread dough in order to simultaneously carry out their pre-baking, and finally to increase baking frequency of bread dough.

By utilizing a chunk of frozen bread dough, it will be possible to simplify the work in a bakery and to significantly reduce the workload, when compared with a conventional scratch baking method wherein all the processes from mixing to baking are continuously in store. Without a specialized apparatus such as a mixer or proofer, and a professional baker or artisan having a specialized technique, it would be therefore possible to make bread with a small amount of investment and working space.

However, even if the chunk of frozen bread dough is used at a usual bakery where 60~100 kinds of bread are made, they can not be produced more than twice per day so that freshly baked bread can hardly be always provided to customers all the day.

The reasons for that may be as follows, for example: First, according to the conventional pre-baking treatment methods, the thawing and shaping processes have to be repeated for each baking process, and it is actually impossible to frequently repeat the processes; second, since each kind of bread items needs different time for their thawing and final proofing processes, an individual treatment will be required for each kind of bread. As a result, the number of working processes and working frequency will be increased and working processes will be more complicated as the number of the bread items are increased.

It is therefore desirable to simplify the working for bread making by continuously carrying out thawing and proofing processes, and keeping the proofed bread dough for a certain period of time so that the following final proofing and baking can be done at any optional time.

DISCLOSURE OF THE INVENTION

The present invention is related to a method for the pre-baking treatment of a chunk of frozen bread dough, comprising continuously carrying out a thawing process and a proofing process of the chunk of frozen bread dough in a container while keeping its inner temperature at a range of 17~40° C., preferably of 22~35° C. and its inner relative humidity at a range of 50~75%, preferably of 60~65%, and after the completion of the proofing, lowering its inner temperature to a range of —20~15° C., preferably of 0~10° C. at a lowering rate of 0.2° C./min or more, preferably 0.4° C./min or more while controlling the difference between a dew point in the container and a temperature on the bread surface within 20° C. or less, preferably 15° C. or less so that the condition of the bread dough may be maintained, followed by a shaping process and a final proofing process.

According to the present invention, it is possible to continuously carry out the thawing and proofing processes of the chunk of frozen bread dough by putting the bread dough in a container whose inner temperature and relative humidity have already been set at desired ranges without necessity of any further change of its temperature or relative humidity thereafter.

An "inner relative humidity" means that of air in the container and is an average value subjected to fluctuation at a range of about ±10%.

The time required for the thawing and proofing under the high temperature and low relative humidity in the present invention may be optionally determined by those skilled in the art, usually ranging from several tens minutes to about 10 hours, preferably from about 2 to 4 hours. The time required for the maintaining and proofing under the low temperature and high relative humidity in the present invention may be optionally determined by those skilled in the art, too, usually ranging from about 30 min to about 24 hours, preferably from about 2 to 6 hours.

If the bread dough is maintained at a higher temperature than said range for a long period of time, it will be overproofed and cause disadvantages such as insufficiency in baking color and sweetness.

According to the present invention, the temperature or relative humidity in the container during the thawing and proofing processes is not necessarily kept at a constant level, either, as long as they are kept at the above ranges.

It is not necessary to keep the lowing rate of the temperature at a constant level, either, but may change gradually or continuously in the above range.

According to the present invention, bread dough with an excellent shaping-workability and an appropriate moistness will be produced in a container by thawing and proofing a chunk of frozen bread dough in the container under a high temperature and a low relative humidity, and maintaining the condition of the bread dough to continue the proofing under a low temperature and a high relative humidity for a certain period of time.

Further, any precautions to prevent the dampness on the surface of the bread dough, such as covering it with a sheet of plastic film, are not necessary, so that the workability and sanitation will be improved.

The maintenance of the bread dough under a proofing condition for several hours after the thawing and proofing in the present invention will produce a proofing taste and give a sufficient degree of proofing, resolving the problem of irregularity in thawing that was found in the prior methods. And the bread dough with a stable temperature may be given, which can also be finally proofed in a stable condition (the time for the final proofing) in the following final proofing process.

Further, according to the present invention, it is possible to rapidly inhibit the activity of bakers' yeast in the bread by lowering the inner temperature to a range of −20~15° C., preferably of 0~10° C. at a lowering rate of 0.2° C./min or more, preferably 0.4° C./min or more.

As a result, it is possible to minimize the change in the condition of the bread, especially that in its volume, so that the bread dough may be maintained in an excellent condition.

And it is possible to obtain bread dough with an excellent shaping-workability and an appropriate moistness on its surface by controlling the difference between a dew point in the same container and a temperature on the bread surface within 20° C. or less.

Alternatively, the continuous processes of thawing and proofing of the present invention may be carried out by raising its inner temperature to a range of 17~40° C., preferably of 20~40° C. at a raising rate of 0.1~2°° C./min, preferably 0.3~1° C./min and with its inner relative humidity at a range of 50~75%. It is possible to obtain bread dough with an excellent shaping-workability and an appropriate moistness on its surface, especially by keeping the difference between a dew point in the container and a temperature of the bread surface within 20° C. or less, preferably within 15° C. or less.

In the above case, it is not necessary to keep the container with its inner temperature at a range of 17~40° C. at the time of putting the bread dough in it. Thus, the bread may be put and kept in the container with its inner temperature at a range of −20~15° C. and its inner temperature may be raised later.

The raising rate is not necessarily kept at the same level during the raising period, but may be varied within the above range. Thus, the raising rate may change continuously or gradually. Further, after the temperature in the container has been raised to a certain level, it may be kept within the above range to continue the proofing process.

The difference between a dew point in the container and a temperature of the bread surface according to the present invention is an average value and subjected to fluctuation at a range of about ±10%.

The above difference may be determined by any method known to those skilled in the art. For example, the dew point of air may be obtained from a psychrometric chart that shows a relationship between a temperature and humidity, and the temperature on the bread surface may be actually measured by means of a known temperature sensor.

The present inventors also have found that the bread dough after the shaping process may be maintained under the same condition in a refrigerator for a certain period of time, for example for 30 min~5 hours, by keeping its inner temperature at a range of −5~20° C., preferably of −5~5° C. and its inner relative humidity at a range of 80~100%, followed by the final proofing and baking processes.

Thus, under the above condition, the activity of bakers' yeast is so low that the bread dough will hardly swell, and the appropriate moistness on the surface of the bread dough may be kept during the long period of time.

As a result, it is possible according to the present invention to simultaneously carry out a complicated shaping process in the pre-baking treatment, allowing an optional shifting to the next final proofing process and baking process at any desired time.

Further, the bread dough after the final proofing process may be maintained under the same condition in a refrigerator for a certain period of time, for example for 30 min~5 hours, by keeping its inner temperature at a range of −5~20° C., preferably of −5~5° C. and its inner relative humidity at a range of 80~100%, followed by the baking process at an optional timing.

In this case, however, since the bread dough may further swell to some extent during the above maintaining period due to an increased activity of the bakers' yeast after the final proofing, the final proofing should be finished in an earlier stage than usual.

According to the present invention, the above maintaining period may be provided both before and after the final proofing process.

An apparatus which may be used in the present invention for thawing, final proofing, and maintaining the bread dough under cooling after the final proofing process is generally called a "dough conditioner," in which heating, cooling, humidifying, and dehumidifying may be optionally done. Especially, it is desirable to use a dough conditioner having a cooling power of more than 400 W, preferably more than 600 W and a heating power of more than 600 W, preferably more than 1 KW per 20 Kg of frozen bread dough. Any other type of dough conditioners known in the art may be used in the present invention.

There is no limitation with respect to materials used for the present chunk of frozen bread dough and their content ratios. For example, those skilled in the art may optionally select them depending on the kind of final products including sweetened buns such as bean-filled ones and butter roll.

Starting bread dough prepared by optionally mixing various materials may be subjected to well known processes such as pre-treatment, mixing, kneading, and proofing, then dividing, rounding, dry-proofing, and molding, followed by freezing by means of a freezer such as an "air blast freezer" and keeping in the freezer and the like at an appropriate temperature.

It is not necessary to keep the bread dough in a "bench time" in the method according to the present invention, but the bread dough may be shaped immediately after the thawing and proofing processes. The shaping process may be carried out by means of any conventional apparatus such as a molder.

The shape of the frozen bread dough may be optionally selected by those skilled in the art depending on the kind of the final products.

BEST MODE FOR CARRYING OUT THE INVENTION

The present invention will be further described in more detail, with reference to the following examples which, however, should not be construed to limit the scope of the present invention in any sense.

"Bakers' %" and "%" in the following Tables mean "Parts by weight," as are well known and obvious to those skilled in the art.

EXAMPLE 1

A chunk of frozen bread dough was prepared in a manner summarized in Table 1

TABLE 1

Composition and Processes
Unit: Bakers' %

| Composition of Proofing Seed | Contents |
| --- | --- |
| Wheat Flour | 60% |
| Yeast | 2 |
| Yeast Food | 0.1 |
| Water | 36 |
| Proofing Condition | 27° C., 3 hours |
| Composition of Final Dough | Bread |
| Wheat Flour | 40% |
| Salt | 1.8 |
| Sugar | 5 |
| Nonfat Milk Powder | 2 |
| Shortening | 8 |
| Anti-freezing Yeast | 3 |
| Frozen Dough Modifier | 1 |
| Water | 29 |
| Proofed Dough | 98 |
| Proofing Condition | 22° C., 20 min |
| Weight of a Divided Piece | 360 g |
| Condition for Freezing | −30° C., 30 min |

The chunk of frozen bread dough prepared in the above manner was taken out from a freezer, and put in a dough conditioner controlled at its inner temperature of 30° C. and its inner relative humidity of 70% and kept for 90 min. The dough conditioner was then set at its inner temperature of 10° C. and inner relative humidity of 98% to lower its inner temperature at a lowering rate of 0.7° C./min, during which lowering period the difference between a dew point in the container and a temperature on the bread surface was controlled within 15° C. or less. The bread dough was taken out from the container after 120 min, immediately shaped, and put in a proofer controlled at its inner temperature of 35° C. and its inner relative humidity of 70% for final proofing, followed by a baking process.

EXAMPLE 2

The chunk of frozen bread dough prepared in the same manner as in EXAMPLE 1 was taken out from a freezer, put in a dough conditioner controlled at its inner temperature of −20° C. and kept for 10 hours. The dough conditioner was then set at its inner temperature of 30° C. and inner relative humidity of 50% to raise the temperature in the dough conditioner at a raising rate of 1° C./min for 110 min, during which raising period the difference between a dew point in the container and a temperature on the bread surface was controlled within 15° C. or less. The bread dough was further maintained for 40 min in the dough conditioner set at its inner temperature of 30° C. and inner relative humidity of 70%. The dough conditioner was then set at its inner temperature of 10° C. and inner relative humidity of 98% to lower the temperature in the dough conditioner at a lowing rate of 0.7° C./min for 120 min. It was then taken out from the container, immediately shaped, and put in a proofer controlled at its inner temperature of 35° C. and its inner relative humidity of 70% for final proofing, followed by a baking process.

EXAMPLE 3

The chunk of frozen bread dough prepared in the same manner as in EXAMPLE 1 was taken out from a freezer, put in a dough conditioner controlled at its inner temperature of 10° C. The dough conditioner was then set at its inner temperature of 30° C. and inner relative humidity of 50% to raise the temperature in the dough conditioner at a raising rate of 1° C./min for 60 min, during which raising period the difference between a dew point in the container and a temperature on the bread surface was controlled within 15° C. or less. The bread dough was further maintained for 30 min in the dough conditioner set at its inner temperature of 30° C. and inner relative humidity of 70%. The dough conditioner was then set at its inner temperature of 10° C. and inner relative humidity of 98% to lower the temperature in the dough conditioner at a lowing rate of 0.7° C./min for 120min. It was then taken out from the container, immediately shaped, and put in a proofer controlled at its inner temperature of 35° C. and its inner relative humidity of 70% for final proofing, followed by a baking process.

EXAMPLE 4

The chunk of frozen bread dough prepared in the same manner as in EXAMPLE 1 was taken out from a freezer and put in a dough conditioner controlled at its inner temperature of 10° C. The dough conditioner was set at its inner temperature of 30° C. and inner relative humidity of 50% to raise the temperature in the dough conditioner at a raising rate of 1° C./min for 60 min. The bread dough was then maintained for 30 min in the dough conditioner set at its inner temperature of 30° C. and inner relative humidity of 70%. The dough conditioner was set at a temperature of 10° C. and inner relative humidity of 98% to lower the temperature in the dough conditioner at a lowing rate of 0.7° C./min for 120 min. It was then taken out from the container, immediately shaped, and put in a refrigerator controlled at its inner temperature of 5° C. and its inner relative humidity of 90% and kept for one hour. The bread dough was then taken out from the refrigerator and put in a proofer controlled at its inner temperature of 35° C. and inner relative humidity of 70% for final proofing, followed by a baking process.

EXAMPLE 5

The chunk of frozen bread dough prepared in the same manner as in EXAMPLE 1 was taken out from a freezer and put in a dough conditioner controlled at its inner temperature of 10° C. The dough conditioner was set at its inner temperature of 30° C. and inner relative humidity of 50% to raise the temperature in the dough conditioner at a raising rate of 1° C./min for 60 min. The bread dough was then maintained for 30 min in the dough conditioner set at its inner temperature of 30° C. and inner relative humidity of 70%. The dough conditioner was set at a temperature of 10° C. and inner relative humidity of 98% to lower the temperature in the dough conditioner at a lowing rate of 0.7° C./min for 120 min. The bread dough was then taken out from the container, immediately shaped, and put in a proofer controlled at its inner temperature of 35° C. and inner relative humidity of 70% for final proofing. After the completion of the final proofing, the bread dough was put in a refrigerator controlled at its inner temperature of 5° C. and its inner relative humidity of 90% and kept for one hour. The bread dough was then taken out from the refrigerator and baked.

EXAMPLE 6

The chunk of frozen bread dough prepared in the same manner as in EXAMPLE 1 was taken out from a freezer and put in a dough conditioner controlled at its inner temperature of 10° C. The dough conditioner was then set at its inner temperature of 30° C. and inner relative humidity of 50% to raise the temperature in the dough conditioner at a raising rate of 1° C./min for 60 min. The bread dough was then maintained for 30 min in the dough conditioner set at its inner temperature of 30° C. and inner relative humidity of 70%. The dough conditioner was set at a temperature of 10° C. and inner relative humidity of 98% to lower the temperature in the dough conditioner at a lowing rate of 0.7° C./min for 120 min. The bread dough was then taken out from the container, immediately shaped, and put in a refrigerator controlled at its inner temperature of 5° C. and its inner relative humidity of 90% and kept for one hour. It was then taken from the refrigerator and put in a proofer controlled at its inner temperature of 35° C. and inner relative humidity of 70 % for final proofing. After the completion of the final proofing, the bread dough was put in the refrigerator controlled at its inner temperature of 5° C. and its inner relative humidity of 90% and kept for one hour. The bread dough was then taken out from the refrigerator and baked.

Comparative Example 1

The chunk of frozen bread dough was prepared in the same manner as in EXAMPLE 1. It was taken out from a freezer, put in a dough conditioner controlled at its inner temperature of 10° C. The dough conditioner was then set at its inner temperature of 30° C. and inner relative humidity of 80% to raise its inner temperature at a raising rate of 1° C./min, during which raising period the difference between a dew point in the container and a temperature on the bread surface was more than 20° C. The bread dough was taken out from the container after 90 min, immediately shaped, and put in a proofer controlled at its inner temperature of 35° C. and its inner relative humidity of 70% for final proofing, followed by a baking process.

Comparative Example 2

The chunk of frozen bread dough prepared in the same manner as in EXAMPLE 1 was taken out from a freezer, put in a dough conditioner controlled at its inner temperature of 10° C. The dough conditioner was then set at its inner temperature of 30° C. and inner relative humidity of 50% to raise the temperature in the dough conditioner at a raising rate of 1° C./min for 60 min. The bread dough was further maintained for 30 min in the dough conditioner set at its inner temperature of 30° C. and inner relative humidity of 70%. The dough conditioner was then set at its inner temperature of 10° C. and inner relative humidity of 60% to lower the temperature in the dough conditioner at a lowing rate of 0.7° C./min for 120 min, during which lowering period the difference between a dew point in the container and a temperature on the bread surface was more than 20° C. It was then taken out from the container, immediately shaped, and put in a proofer controlled at its inner temperature of 35° C. and its inner relative humidity of 70% for final proofing, followed by a baking process.

Comparative Example 3

The chunk of frozen bread dough prepared in the same manner as in EXAMPLE 1 was taken out from a freezer, put in a dough conditioner controlled at its inner temperature of 10° C. The dough conditioner was then set at its inner temperature of 30° C. and inner relative humidity of 50% to raise the temperature in the dough conditioner at a raising rate of 1° C./min for 60 min. The bread dough was further maintained for 30 min in the dough conditioner set at its inner temperature of 30° C. and inner relative humidity of 70%. The dough conditioner was then set at its inner temperature of 10° C. and inner relative humidity of 98% to lower the temperature in the dough conditioner at a lowing rate of 0.7° C./min for 120 min. It was then taken out from the container, immediately shaped, and kept for one hour in a room at a temperature of 28° C. and relative humidity of 65%. It was then put in a proofer controlled at its inner temperature of 35° C. and its inner relative humidity of 70% for final proofing, followed by a baking process.

Comparative Example 4

The chunk of frozen bread dough prepared in the same manner as in EXAMPLE 1 was taken out from a freezer, put in a dough conditioner controlled at its inner temperature of 10° C. The dough conditioner was then set at its inner temperature of 30° C. and inner relative humidity of 50% to raise the temperature in the dough conditioner at a raising rate of 1° C./min for 60 min. The bread dough was further maintained for 30 min in the dough conditioner set at its inner temperature of 30° C. and inner relative humidity of 70%. The dough conditioner was then set at its inner temperature of 10° C. and inner relative humidity of 98% to lower the temperature in the dough conditioner at a lowing rate of 0.7° C./min for 120 min. It was then taken out from the container, immediately shaped, and put in a proofer controlled at its inner temperature of 35° C. and its inner relative humidity of 70% for final proofing. After the completion of the final proofing, it was kept for one hour in a room at a temperature of 28° C. and relative humidity of 65%, followed by a baking process.

The results obtained in the above Examples and Comparative Examples are summarized in Table 2 below.

TABLE 2

| | Condition of Dough before Baking | | Evaluation of the Quality of Product | |
|---|---|---|---|---|
| EXAMPLE 1 | ○ | Excellent | ○ | Excellent |
| EXAMPLE 2 | ○ | Excellent | ○ | Excellent |
| EXAMPLE 3 | ○ | Excellent | ○ | Excellent |
| EXAMPLE 4 | ○ | Excellent | ○ | Excellent |
| EXAMPLE 5 | ○ | Excellent | ○ | Excellent |

TABLE 2-continued

| | Condition of Dough before Baking | | Evaluation of the Quality of Product | |
|---|---|---|---|---|
| EXAMPLE 6 | ○ | Excellent | ○ | Excellent |
| COMPARATIVE 1 | × | Sticky on the Dough Surface, Bad Workability | Δ | Bad in Shape and Condition of the Surface |
| COMPARATIVE 2 | × | Dry on the Dough Surface | × | Occurrence of Dry Layer within the Bread |
| COMPARATIVE 3 | Δ | Dry on the Dough Surface | Δ | Rough on the Bread Surface, Unstable in Quality |
| COMPARATIVE 4 | × | Dry on the Dough Surface, Over-proofed | × | Rough on the Bread Surface, Too Much Volume |

The condition of the bread dough before baking process in the EXAMPLEs was more excellent and the quality of their bread products obtained after baking was also more excellent than those in the COMPARATIVE EXAMPLEs.

It has been revealed that the thawing and proofing under a particular range of the high temperature and the low relative humidity will produce an excellent proofing taste of the bread after the baking. Further, the bread dough kept under a particular range of the low temperature has an appropriate moistness on its surface, and shows excellent extensibility and shaping-workability.

The bread dough that was thawed at the inner temperature of 30° C. and inner relative humidity of 80% in COMPARATIVE EXAMPLE 1 showed the occurrence of a lot of dampness on its surface, so that it became very sticky and its workability and shape were adversely affected.

The keeping of the bread dough under the low temperature and low relative humidity in COMPARATIVE EXAMPLE 2 showed dryness on its surface and caused roughness on and within the dough.

It has also revealed that it is possible to maintain the bread dough in an excellent condition by keeping the bread dough after the shaping or after the final proofing in a refrigerator set at a temperature of 5° C. and relative humidity of 90% or more. Although the bread dough may swell for only a short period of time after the final proofing, it will not cause any serious problem.

On the other hand, COMPARATIVE EXAMPLEs 3 and 4 demonstrated that keeping the bread dough at a room temperature would cause the over-swelling and dryness on the surface of the bread dough and the product, adversely affecting the quality of the products.

Advantages of the Invention

According o the present invention, it is possible to start the thawing of the frozen bread dough at the night before or at any optional time, so that the thawed bread dough may be always provided.

The condition of the thawed bread dough is stable and the following processes may be done at any time. Thus, a desired amount of the thawed bread dough may be subjected to the final proofing and baking processes, depending on request. It is therefore possible to bake the bread more than twice per day and to control the number of the baked final products considering the sales circumstances.

According to the present invention, it has now become possible for few workers to bake many kinds of bread dough with a high frequency at any optional time without a highly specialized technique.

What is claimed is:

1. A method for pre-baking treatment of a chunk of frozen bread dough, comprising:
   placing the chunk of frozen bread dough in a container;
   keeping an inner temperature of the container in a range of 17° C. to 40° C. and relative humidity in the container in a range of 50% to 75% to thaw and proof the chunk of frozen bread dough continuously;
   lowering the inner temperature of the container to a range of −20° C. to 15° C. at a lowering rate of 0.2° C./min to 0.7° C./min after proofing the bread dough;
   controlling a temperature difference between a dew point of air inside the container and a surface temperature of the bread dough to be within 20° C. during the lowering step;
   taking out the bread dough from the container after the lowering step;
   shaping the bread dough taken out from the container; and
   finally proofing the bread dough in a proofer after the shaping step.

2. A method for pre-baking treatment of a chunk of frozen bread dough, comprising:
   placing the chunk of frozen bread dough in a container;
   raising an inner temperature of the container to a range of 17° C. to 40° C. at a raising rate of 0.1° C./min to 2° C./min to thaw and proof the chunk of frozen bread dough continuously;
   lowering the inner temperature of the container to a range of −20° C. to 15° C. at a lowering rate of 0.2° C./min to 0.7° C./min after proofing the bread dough;
   controlling a temperature difference between a dew point of air inside the container and a surface temperature of the bread dough to be within 20° C. during the raising and lowering steps;
   taking out the bread dough from the container after the lowering step;
   shaping the bread dough taken out from the container; and
   finally proofing the bread dough in a proofer after the shaping step.

3. A method for pre-baking treatment of a chunk of frozen bread dough according to claim 2, wherein the inner temperature of the container is raised to a range of 20° C. to 40° C. at a raising rate of 0.3° C./min to 1° C./min during the raising step.

4. A method for pre-baking treatment of a chunk of frozen bread dough according to claim 1, wherein the lowering rate is at least 0.4° C./min.

5. A method for pre-baking treatment of a chunk of frozen bread dough according to claim 2, wherein the lowering rate is at least 0.4° C./min.

6. A method for pre-baking treatment of a chunk of frozen bread dough according to claim 3, wherein the lowering rate is at least 0.4° C./min.

7. A method for pre-baking treatment of a chunk of frozen bread dough according to claim 1, further comprising:
   keeping an inner temperature of a container in a range of −5° C. to 20° C. and relative humidity in the container in a range of 80% to 100% between the shaping and final proofing steps;
   placing the bread dough in the container for a certain period; and
   then finally proofing the bread dough.

8. A method for pre-baking treatment of a chunk of frozen bread dough according to claim 2, further comprising:

keeping an inner temperature of a container in a range of −50° C. to 20° C. and relative humidity in the container in a range of 80% to 100% between the shaping and final proofing steps;

placing the bread dough in the container for a certain period; and then finally proofing the bread dough.

9. A method for pre-baking treatment of a chunk of frozen bread dough according to claim 3, further comprising:

keeping an inner temperature of a container in a range of −5° C. to 20° C. and relative humidity in the container in a range of 80% to 100% between the shaping and final proofing steps;

placing the bread dough in the container for a certain period; and then finally proofing the bread dough.

10. A method for pre-baking treatment of a chunk of frozen bread dough according to claim 4, further comprising:

keeping an inner temperature of a container in a range of −5° C. to 20° C. and relative humidity in the container in a range of 80% to 100% between the shaping and final proofing steps;

placing the bread dough in the container for a certain period; and then finally proofing the bread dough.

11. A method for pre-baking treatment of a chunk of frozen bread dough according to claim 5, further comprising:

keeping an inner temperature of a container in a range of −5° C. to 20° C. and relative humidity in the container in a range of 80% to 100% between the shaping and final proofing steps;

placing the bread dough in the container for a certain period; and then finally proofing the bread dough.

12. A method for pre-baking treatment of a chunk of frozen bread dough according to claim 6, further comprising:

keeping an inner temperature of a container in a range of −5° C. to 20° C. and relative humidity in the container in a range of 80% to 100% between the shaping and final proofing steps;

placing the bread dough in the container for a certain period; and then finally proofing the bread dough.

13. A method for pre-baking treatment of a chunk of frozen bread dough according to claim 1, further comprising:

keeping an inner temperature of a container in a range of −5° C. to 20° C. and relative humidity in the container in a range of 80% to 100% after the final proofing step;

placing the bread dough in the container for a certain period; and then baking the bread dough.

14. A method for pre-baking treatment of a chunk of frozen bread dough according to claim 2, further comprising:

keeping an inner temperature of a container in a range of −5° C. to 20° C. and relative humidity in the container in a range of 80% to 100% after the final proofing step;

placing the bread dough in the container for a certain period; and then baking the bread dough.

15. A method for pre-baking treatment of a chunk of frozen bread dough according to claim 3, further comprising:

keeping an inner temperature of a container in a range of −5° C. to 20° C. and relative humidity in the container in a range of 80% to 100% after the final proofing step;

placing the bread dough in the container for a certain period; and then baking the bread dough.

16. A method for pre-baking treatment of a chunk of frozen bread dough according to claim 4, further comprising:

keeping an inner temperature of a container in a range of −5° C. to 20° C. and relative humidity in the container in a range of 80% to 100% after the final proofing step;

placing the bread dough in the container for a certain period; and then baking the bread dough.

17. A method for pre-baking treatment of a chunk of frozen bread dough according to claim 5, further comprising:

keeping an inner temperature of a container in a range of −5° C. to 20° C. and relative humidity in the container in a range of 80% to 100% after the final proofing step;

placing the bread dough in the container for a certain period; and then baking the bread dough.

18. A method for pre-baking treatment of a chunk of frozen bread dough according to claim 6, further comprising:

keeping an inner temperature of a container in a range of −5° C. to 20° C. and relative humidity in the container in a range of 80% to 100% after the final proofing step;

placing the bread dough in the container for a certain period; and then baking the bread dough.

19. A method for pre-baking treatment of a chunk of frozen bread dough according to claim 7, further comprising:

keeping an inner temperature of a container in a range of −5° C. to 20° C. and relative humidity in the container in a range of 80% to 100% after the final proofing step;

placing the bread dough in the container for a certain period; and then baking the bread dough.

20. A method for pre-baking treatment of a chunk of frozen bread dough according to claim 1, wherein the inner temperature of the container is kept in a range of 22° C. to 35° C.

21. A method for pre-baking treatment of a chunk of frozen bread dough according to claim 2, wherein the inner temperature of the container is kept in a range of 22° C. to 35° C.

* * * * *